April 8, 1969   F. S. PRESTON   3,438,033
DOPPLER RESOLUTION OF INTERFEROMETER AMBIGUITIES
Filed Jan. 30, 1968
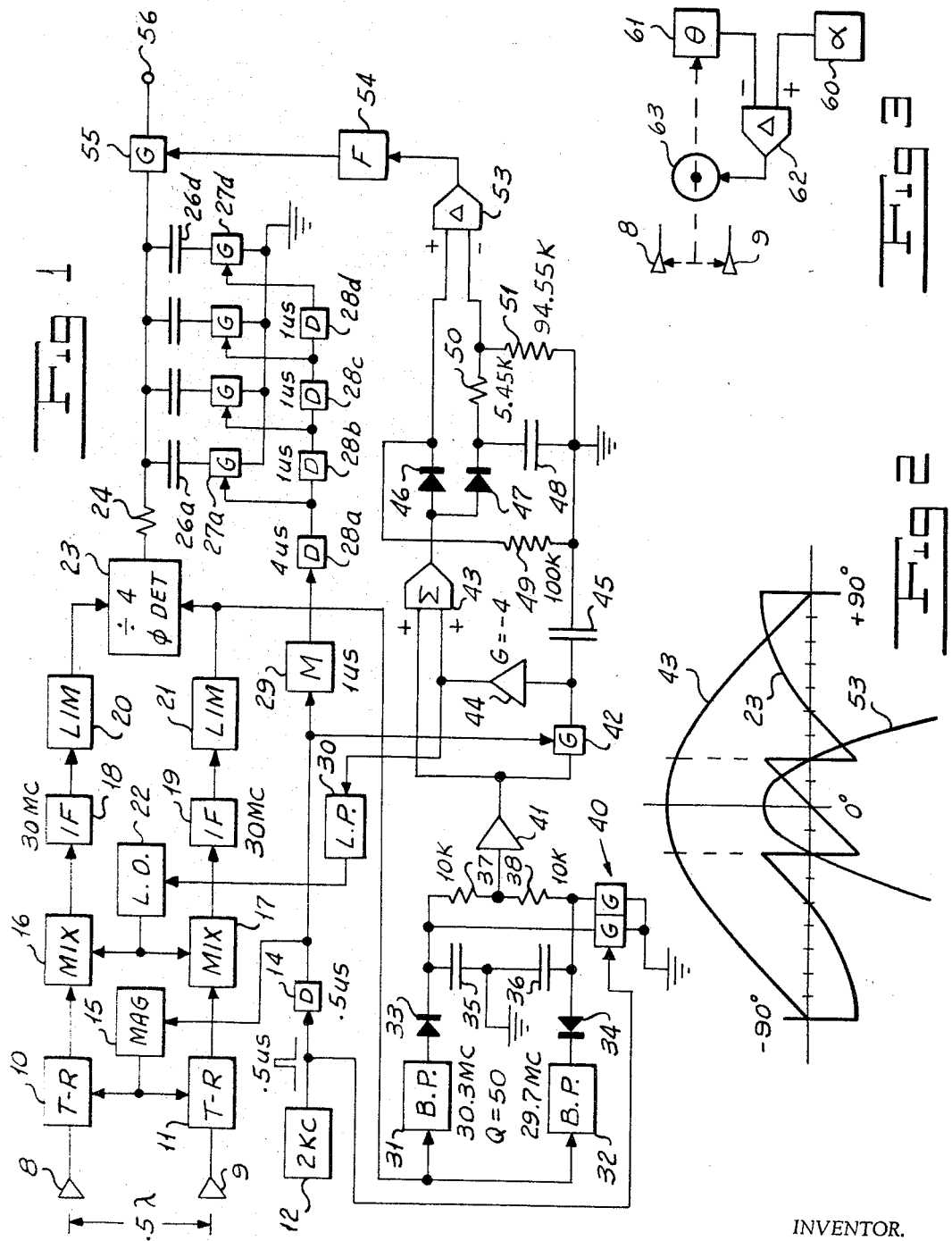
INVENTOR.
Frank S. Preston
BY
Shenier & O'Connor
ATTORNEYS United States Patent Office 3,438,033
Patented Apr. 8, 1969

3,438,033
DOPPLER RESOLUTION OF INTERFEROMETER AMBIGUITIES
Frank S. Preston, Fairfield, Conn., assignor to United Aircraft Corporation, East Hartford, Conn., a corporation of Delaware
Filed Jan. 30, 1968, Ser. No. 701,688
Int. Cl. G01s 9/02
U.S. Cl. 343—16                     8 Claims

ABSTRACT OF THE DISCLOSURE

Multiple ambiguities in interferometer radar systems having a large horn spacing are resolved by employing the Doppler frequency shift in the radar return as a measure of elevation angle.

BACKGROUND OF THE INVENTION

In the prior art, ambiguities in interferometer radar systems have been resolved by varying the frequency of transmitted pulses and synchronously detecting the apparent shifts in elevation angle which result from this frequency modulation. Such system is disclosed in co-pending application Ser. No. 655,642 filed July 24, 1967.

SUMMARY OF THE INVENTION

One object of my invention is to provide an interferometer radar in which multiple ambiguities are prevented by measuring the Doppler frequency shift in the radar return.

Another object of my invention is to provide a Doppler-resolved air-borne interferometer radar system in which Doppler frequency shift is referenced to the maximum Doppler frequency from return along an extension of the flight path.

Other and further objects of my invention will appear from the following description.

DESCRIPTION OF THE DRAWINGS

In the accompanying drawings which form part of the instant specification and which are to be read in conjunction therewith and in which like reference numerals are used to indicate like parts in the various views:

FIGURE 1 is a schematic view illustrating a preferred but simplified embodiment of my invention.

FIGURE 2 is a graph showing the outputs of various components as a function of the elevation angle of radar return relative to the flight path of the aircraft.

FIGURE 3 is a schematic view showing the angle of attack correction for deviations in the flight path from the longitudinal axis of the aircraft.

DESCRIPTION OF THE PREFERRED EMBODIMENTS

Referring now more particularly to FIGURE 1, a pair of horns 8 and 9 having a vertical spacing of 1.5 wave lengths are coupled to respective transmit-receive devices 10 and 11. A two kilocycle free-running multivibrator 12 provides output pulses of .5 microsecond duration with a corresponding pulse spacing of 500 $\mu$sec. The output of multivibrator 12 is coupled through a .5 $\mu$sec. delay network 14 to energize a magnetron 15, which may provide an output frequency of 25 kmc. The output of magnetron 15 is coupled to transmit-receive tubes 10 and 11. Tubes 10 and 11 are further coupled to respective mixers 16 and 17 which are driven by a local oscillator 22 to provide difference frequencies of 30 mc. The outputs of mixers 16 and 17 are applied to respective intermediate frequency amplifiers 18 and 19, the outputs of which are applied to respective limiters 20 and 21. The outputs of limiters 20 and 21 drive a divide-by-four phase detector 23, the construction of which is shown in detail in the aforementioned co-pending application. Phase detector 23 provides substantially linear outputs corresponding to relative phase shifts of $\pm 45°$ for inputs from limiters 20 and 21 having relative phase shifts of $\pm 180°$.

The output of phase detector 23 is applied through a resistor 24 to one plate of each of capacitors 26a through 26d. The other plates of the capacitors 26 are connected through respective gates 27a through 27d to ground. The output of delay network 14 is coupled to a monostable multivibrator 29, providing output pulses of 1 $\mu$sec. duration which are applied to a 4 $\mu$sec. delay network 28a. The output of delay network 28a actuates gate 27a and is coupled to a 1 $\mu$sec. delay network 28b. The output of network 28b actuates gate 27b and drives 1 $\mu$sec. delay network 28c. The output of network 28c actuates gate 27c and is coupled to 1 $\mu$sec. delay network 28d, the output of which actuates gate 27d. Network 28a is provided with a larger time delay than the remaining networks 28b through 28d to allow for a recovery time of approximately 4 $\mu$sec. of the transmit-receive tubes 10 and 11. Capacitors 26, gates 27, and delay networks 28 comprise a range-gated comb filter. In practice, there should be some 496 of each of these components to store all of the available elevation angle information occurring during the 500 $\mu$sec. period between pulses.

The output of limiter 21 is coupled to band-pass filters 31 and 32 having respective tuned frequencies of 30.3 mc. and 29.7 mc. Each of filters 31 and 32 has a Q of 50. The bandwidth of filters 31 and 32 is 0.6 mc. or $\pm 0.3$ mc. Thus for an intermediate frequency of 30 mc., each of the filters provides an output which is 70.7% of its maximum response. The output of filter 31 is coupled to the anode of a diode 33; and the output of filter 32 is coupled to the cathode of a diode 34. The cathode of diode 33 is coupled to ground through a capacitor 35 and is coupled to the input of a buffer amplifier 41 through a 10K resistor 37. The anode of diode 34 is coupled to ground through a capacitor 36 and is coupled to the input of buffer amplifier 41 through a 10K resistor 38. The ungrounded terminals of capacitors 35 and 36 are each coupled to ground through a pair of gates, indicated generally by the reference numeral 40, which are simultaneously actuated by the output of free-running multivibrator 12. The output of buffer amplifier 41 is coupled to one input of a summing amplifier 43 and is further applied through a gate 42 to one plate of a capacitor 45, the other plate of which is grounded. Gate 42 is actuated by the output of delay network 14. The ungrounded terminal of capacitor 45 is applied to the input of an inverting amplifier 44 having a negative gain of four. The output of amplifier 44 is coupled to the other input of summing amplifier 43 and is further applied through a low-pass filter 30 to a frequency control input of local oscillator 22.

The output of summing amplifier 43 is applied to the anodes of diodes 46 and 47. The cathode of diode 46 is applied to the positive input of a differential amplifier 53 and is coupled to ground through a 100K resistor 49. The cathode of diode 47 is coupled to ground through a parallel circuit comprising capacitor 48 and series-connected voltage dividing resistors 50 and 51, having respective values of 5.45K and 94.55K. The junction of the voltage dividing resistors is applied to the negative input of differential amplifier 53. The output of differential amplifier 53 drives a single-input distable flip-flop 54. The common output of the range-gated filter capacitors 26 is applied through a gate 55 to an output terminal 56. Gate 55 is actuated by the output of bistable flip-flop 54.

The horns 8 and 9 are oscillated in azimuth angle Z, as will be understood by those skilled in the art, in order to scan an appreciable segment of terrain in front of the aircraft.

Referring now to FIGURE 2, it will be seen that phase detector 23 provides substantially linear outputs for radar return from elevation angles E up to ±19.47°. For a horn spacing of 1.5 wave lengths, a relative phase shift of ±180° or one-half wave length occurs in the output of limiters 20 and 21 at arc sin 1/3=19.47°. It will be seen from FIGURE 2 that phase detector 23 provides outputs corresponding to three separate regions. A first region extends from elevation angles of −90° to −19.47°; a middle region extends from −19.47° to +19.47°; and the third region extends from +19.47° to +90°. It is desired to produce at output terminal 56 only elevation angles within the middle region. In FIGURE 2, the output curve of summing amplifier 43 represents the Doppler frequency shift of radar return as a function of the elevation angle E for azimuth angle Z=0. This output is a cosine, having a maximum value for radar return from points aligned with the flight path and having a value of zero for return received from points displaced by ±90° relative to the flight path. The Doppler frequency shift is $2Vf(\cos T)/c$, where T is the total angular displacement from the flight path. The maximum frequency occurs from points aligned with the flight path where $E=Z=T=0°$, and $\cos T=1$. For a transmitted frequency of 25 kmc. and an aircraft velocity of 400 miles per hour, the maximum increase in frequency due to the Doppler effect is 30 kc.

In operation of my invention, pulses from magnetron 15 are coupled through tubes 10 and 11 and radiated from horns 8 and 9A. Reflected pulses received by horns 8 and 9 are coupled through tubes 10 and 11, mixers 16 and 17, intermediate frequency amplifiers 18 and 19, and limiters 20 and 21 to phase detector 23. The output of phase detector 23 is successively applied to the range-gated filter capacitors 26. Band-pass filters 31 and 32 provide equal but opposite outputs across capacitors 35 and 36 if the intermediate frequency is 30 mc., so that the output of buffer amplifier 41 is zero. If the intermediate frequency increases due to Doppler shift, then the output of filter 31 increases while that of filter 32 decreases; and the output of amplifier 41 becomes positive.

The output from free-running multivibrator 12 momentarily enables gates 40, which grounds the outputs across capacitors 35 and 36. The alternating current outputs of filters 30 and 31 drop to zero by virtue of the heavy damping through diodes 33 and 34 on alternate half cycles. The pulse transmitted by magnetron 15 to horn 9 also leaks through tube 11 into mixer 17, thus producing a full output from limiter 21. Since the delay provided by network 14 is equal to the duration of the pulses provided by multivibrator 12, gates 40 are disabled at the instant the magnetron pulse from limiter 21 is impressed on filters 31 and 32. The Q of filters 31 and 32 is 50, which means that their time-constant corresponds to fifty intermediate frequency cycles. The .5 μsec. duration of the magnetron pulse from limiter 21 corresponds to fifteen intermediate frequency cycles. The outputs of the filters 31 and 32 thus build up to $1-e^{-15/50}=.26$, or approximately one-quarter of their steady state values. If the intermediate frequency is precisely 30 mc., then the voltages across capacitors 35 and 36 will both be the same; and the output of buffer amplifier 41 will be zero. However, if the intermediate frequency differs from 30 mc. due to error in the local oscillator frequency, then buffer amplifier 41 will provide an output of a corresponding polarity but of only one-quarter normal sensitivity. The output of delay network 14 actuates gate 42 so that upon termination of the magnetron pulse, there is stored in capacitor 45 a representation of approximately one-quarter of the error frequency. Since amplifier 44 has a negative gain of four, its output will correspond to a full sensitivity error signal. Accordingly, the output of summing amplifier 43 precisely measures the frequency shift in radar return from the transmitted frequency even though the intermediate frequency is not maintained exactly at 30 mc. Since the output of amplifier 44 is coupled to the frequency control of local oscillator 22, the intermediate frequency will be maintained fairly close to 30 mc.

The output of summing amplifier 43 is applied through diode 47 to the peak value filter comprising capacitor 48 which stores the maximum Doppler frequency corresponding to ground return from a point aligned with the flight path. Resistor 49 matches resistors 50 and 51 so that the small voltage drops of diodes 46 and 47 are equal. The output of detector 23 exhibits discontinuities at $E=±19.47°$. It will be noted that $\cos 19.47°=.9428$ and that accordingly the Doppler frequency shift is 94.28% of its maximum value when discontinuities occur in the output of detector 23. Voltage-dividing resistors 50 and 51, however, provide an output corresponding to 94.55% of the peak voltage across capacitor 48. The output of differential amplified 53 is accordingly positive only within the range of $E=\text{arc} \cos .9455=19.00°$. This slight truncation of the middle region of the output of detector 23 provides a safety margin as will be explained hereinafter. Differential amplifier 53 drives flip-flop 54 so that gate 55 is enabled only within the middle region of the output of detector 23.

Referring now to FIGURE 3, there is shown a circuit for changing the vertical orientation of the horns 8 and 9 relative to the longitudinal axis of the aircraft in order to maintain the horns aligned with the flight path. The output of an external vane angle-of-attack detector 60 is coupled to the positive input of a differential amplifier 62. The output of amplifier 62 drives a servomotor 63 which simultaneously rotates horns 8 and 9 about the lateral axis of the aircraft. Servomotor 63 also drives an angular transducer 61 which provides an output proportional to the angular rotation of horns 8 and 9 from alignment with the longitudinal axis of the craft. The output of transducer 61 is applied to the negative input of differential amplifier 62.

When the aircraft is flying at low speeds or is pulling out of a dive, the angle of attack is fairly high so that the flight path may be depressed by as much as 15° below the longitudinal axis of the craft. When the aircraft is entering a dive from level flight, the angle of attack may become negative by as much as 10°, so that the flight path is correspondingly elevated above the longitudinal axis of the craft. The angle-of-attack sensor 60 measures displacement of the flight path from the longitudinal axis of the craft and thus produces a rotation of horns 8 and 9 to maintain them aligned with the flight path. This insures the proper alignment between the outputs of differential amplifier 53 and detector 23.

If the aircraft is in level flight and the terrain is relatively flat, then the Doppler frequency output of summing amplifier 43 will not reach a value corresponding to the velocity of the aircraft along its flight path, since no radar return will be received from terrain aligned with the flight path. However, for altitudes less than 17,000 feet, this introduces no adverse effect. The ratio of resistors 50 and 51 is such as to permit an error of 0.28%. This corresponds to arc cos .9972=4.29°. For 500 μsec. between transmitted pulses the radar range is .093(500)= 46.5 statute miles. If the earth were flat, then the maximum altitude at which an object having a slant range of 46.5 miles could be viewed at a depression angle not exceeding 4.29° would be 46.5(sin 4.29°)=3.48 miles. However, because of the earth's curvature, a distance of nearly 46.5 miles on the earth's surface corresponds to a central angle of .672°. This reduces the maximum altitude by 46.5(sin .336°)=.27 mile. Accordingly, the maximum altitude from which an object 46.5 miles distant can be seen with a depression angle not exceeding 4.29° is 3.48−.27=3.21 miles, which corresponds to 17,000 feet. It will be appreciated that at very low altitudes the aircraft may climb along an upwardly directed flight path of as much as 4.29° and still receive ground return giving a Doppler frequency shift which is only 0.28% less than the frequency shift corresponding to the velocity of the aircraft along its flight path. The range of elevation angles for which the output of amplifier 53 is positive increases from 19.00° to arc cos .9972(.9455)=arc cos .9428= 19.47°, which constitutes the limits of the middle region of the output of detector 23.

Thus far we have assumed that the azimuth angle $Z$ is zero. If the angles $E$, $Z$, and $T$ expressed in radians are small compared with unity, then $\cos E = 1 - \frac{1}{2}E^2$, $\cos Z = 1 - \frac{1}{2}Z^2$, $T = \sqrt{Z^2 + E^2}$, and $\cos T = 1 - \frac{1}{2}Z^2 - \frac{1}{2}E^2$. The maximum Doppler frequency at azimuth angle $Z$ is proportional to $\cos Z$. The Doppler frequency at elevation angle $E$ and azimuth angle $Z$ is proportional to $\cos T$. The limits for a positive output from amplifier 53 are where $$\cos T / \cos Z = .9455$$

Hence $$(1 - \tfrac{1}{2}Z^2 - \tfrac{1}{2}E^2)/(1 - \tfrac{1}{2}Z^2) = .9455$$

$$1 - \tfrac{1}{2}E^2 - \tfrac{1}{4}Z^2E^2 = 1 - .0545$$

$$E = \sqrt{2(.0545)(1 - \tfrac{1}{2}Z^2)} \text{ radian}$$

and thus $$E = 19.00\sqrt{\cos Z} \text{ degrees}$$

If the azimuth oscillation of horns 8 and 9 is ±20°, then at these azimuth extremes, the output of amplifier 53 will be positive for $E = \pm 19.00 \cos 20° = \pm 18.43°$. This causes a relatively minor additional truncation of the middle region of the output of detector 23, which increases the safety margin.

The horns 8 and 9 may be stabilized against roll of the aircraft and thus be maintained in a vertical plane. In such event the output of the angle-of-attack transducer 60 should be multiplied by the cosine of the bank angle before its application to a differential amplifier 62, in order to obtain the component of angle of attack in a vertical plane. It will be appreciated that the horizontal component of deviation between the longitudinal axis and the flight path does not disturb the alignment between the outputs of detector 23 and amplifier 53, since it affects only the azimuth angle as measured in a horizontal plane. For example, if the aircraft is in a sharp 90° banked left turn with an angle of attack of 5°, the maximum clockwise azimuth angle relative to the flight path will be decreased from 20° to 15°; and the maximum counterclockwise azimuth angle will be increased from 20° to 25°. This introduces a slight additional truncation of the middle region of detector 23 at the increased counterclockwise azimuth angle. An external vane side-slip sensor (similar to sensor 60) should also be provided, the output of which is multiplied by the sine of the bank angle and then applied to the positive input of differential amplifier 62. It will be appreciated that slip or skid during a banked turn yields a vertical component of deviation between the flight path and the longitudinal axis of the aircraft. However, skid with wings level merely changes the azimuth angle.

If the horns are not stabilized in roll, then no cosine correction for angle of attack is required. No side-slip sensor is needed, since slip or skid affects only the azimuth angle as measured in the plane of the aircraft. However, the safety margin may be exceeded for azimuth angles opposite to the direction of a banked turn, because of the increased depression angle required to view distant terrain. For example, at low altitude in a turn to the left with 12.1° bank and an azimuth angle of 20° to the right, the depression angle required to bring the line of sight down to the horizon is 20 tan 12.1° = 4.29°. I have shown a simplified embodiment without roll stabilization; and hence bank angles should be limited to less than 12.1° if the safety margin is not to be exceeded even at low altitudes for an azimuth oscillation of ±20°.

By storing the maximum Doppler frequency shift, elevation angles relative to the flight path may be determined without the complexities involved in measuring ground speed and vertical velocity in order to determine the velocity along the flight path and then multiplying by the cosine of the azimuth angle in order to deduce the theoretical maximum Doppler frequency at that azimuth angle.

It will be seen that I have accomplished the objects of my invention. My system eliminates multiple ambiguities in interferometer radar having a wide horn spacing by employing Doppler information in the radar return. My system provides a simplified processing of the Doppler frequency shift which establishes elevation angles relative to the flight path without requiring a determination of aircraft velocity along the flight path by auxiliary ground speed and vertical velocity sensing devices.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A phase interferometer radar system including in combination means for transmitting radar pulses of a predetermined frequency, means including a pair of spaced elements for receiving reflected pulses, the received pulses having relative phase shifts exceeding 360°, first means for precisely determining relative phase shift between received pulses within an interval of 360°, the first means providing an output which cyclically repeats for successive 360° intervals of relative phase shift, means responsive to one of said elements for detecting frequency shifts between transmitted and received pulses, and control means responsive to the detecting means for determining when the output of the first means is within a given interval.

2. A system as in claim 1 which is mounted on a moving aircraft having a longitudinal axis, the system further including means for sensing angular deviations of the flight path of the aircraft from its longitudinal axis, and means responsive to the sensing means for rotating the pair of receiving elements.

3. A system as in claim 2 in which the sensing means includes an angle-of-attack transducer.

4. A system as in claim 1 which is mounted on a moving aircraft, wherein the control means comprises means for determining the velocity of the aircraft along its flight path, and comparing means responsive to both the detecting means and the velocity determining means.

5. A system as in claim 1 in which the control means comprises means for storing the maximum output of the detecting means.

6. A system as in claim 1 in which the control means comprises storage means responsive to the detecting means, and comparing means responsive to both the detecting means and the storage means.

7. A system as in claim 1 in which the control means comprises means for comparing the instantaneous output of the detecting means with a predetermined fraction of the maximum output thereof.

8. A system as in claim 7 in which said fraction is slightly greater than the cosine of that elevation angle of reflected pulses for which the relative phase shift is 180°.

References Cited

UNITED STATES PATENTS 3,212,089 10/1965 Longacre et al. _____ 343—16
3,390,390 6/1968 Vehrs _____ 343—16

RICHARD A. FARLEY, *Primary Examiner.*

CHARLES L. WHITHAM, *Assistant Examiner.*